(12) United States Patent
Nguyen

(10) Patent No.: US 11,613,058 B2
(45) Date of Patent: Mar. 28, 2023

(54) PNEUMATIC IN-MOLD LID CLOSING APPARATUS

(71) Applicant: NYPROMOLD INC., Clinton, MA (US)

(72) Inventor: Tuan Nguyen, Clinton, MA (US)

(73) Assignee: NYPROMOLD, INC., Clinton, MA (US)

(*) Notice: Subject to any disclaimer, the term of this patent is extended or adjusted under 35 U.S.C. 154(b) by 140 days.

(21) Appl. No.: 17/078,697

(22) Filed: Oct. 23, 2020

(65) Prior Publication Data
US 2021/0039293 A1 Feb. 11, 2021

Related U.S. Application Data

(63) Continuation of application No. PCT/US2018/029930, filed on Apr. 27, 2018.

(51) Int. Cl.
*B29C 45/67* (2006.01)
*B29C 45/64* (2006.01)

(52) U.S. Cl.
CPC ........ *B29C 45/67* (2013.01); *B29C 2045/648* (2013.01)

(58) Field of Classification Search
CPC .................... B29C 45/67; B29C 2045/648
USPC ........................................................ 425/589
See application file for complete search history.

(56) References Cited

U.S. PATENT DOCUMENTS

| 7,168,149 | B2 | 1/2007 | Kalemba et al. |
| 7,351,050 | B2 | 4/2008 | Vanderploeg et al. |
| 2009/0084071 | A1 | 4/2009 | Moulin |

FOREIGN PATENT DOCUMENTS

| CN | 204894365 | 12/2015 |
| KR | 10-1998-0019589 A | 6/1998 |
| KR | 10-1998-0083254 A | 12/1998 |
| KR | 10-2013-0048420 A | 10/2013 |
| WO | 02-28622 A1 | 4/2002 |
| WO | 2009/111854 | 9/2009 |

OTHER PUBLICATIONS

Machine Translation KR10-1998-0083254A (Year: 1998).*

(Continued)

*Primary Examiner* — Matthew J Daniels
*Assistant Examiner* — Wayne K. Swier
(74) *Attorney, Agent, or Firm* — Duquette Law Group, LLC

(57) ABSTRACT

An in-mold lid closing apparatus comprises a frame, a first actuation assembly configured to linearly position a lid engagement member between a first and second linear position relative to an in-mold lid, and a second actuation assembly configured to rotatably position the lid engagement member between a first and second rotational position relative to the in-mold lid. The first actuation assembly comprises a first support moveably coupled to the frame and a first actuator coupled to a frame support of the frame and a first actuator drive element coupled to the first support. The second actuation assembly comprises a second support moveably coupled to the frame and disposed between the frame support and the first support and a second actuator coupled to the second support and a second actuator drive element coupled to the first support.

22 Claims, 10 Drawing Sheets

(56) References Cited

OTHER PUBLICATIONS

European Search Report dated Sep. 28, 2021 From Corresponding European Application No. 18916321.5.
International Search Report dated Jan. 28, 2019 From Corresponding PCT Application No. WO2019209335.

* cited by examiner

PNEUMATIC IN-MOLD LID CLOSING APPARATUS

RELATED APPLICATIONS

This patent application is a continuation of International Application No. PCT/US2018/029930, filed on Apr. 27, 2018, entitled, "PNEUMATIC IN-MOLD LID CLOSING APPARATUS," the contents and teachings of which are hereby incorporated by reference in their entirety.

BACKGROUND

Field

Embodiments of the innovation relate, generally, to an apparatus used with an injection mold and configured to close a lid on a molded part following molding of the part by the injection mold.

Description of the Background

Manufacturers utilize injection molds to produce a variety of molded articles. For example, certain injection molds are used to form molded caps having a base portion, a lid portion, and a hinge connecting the base and cap portions. Following molding of the caps, certain injection molds are configured to close the lid portion onto the base portion before the molded cap is processed further. By closing the hinged lid portion onto the base portion following the molding process, the injection mold can aid in maintaining the sterility of the interior of the molded caps and can eliminate the need for additional processing to close the lid portion onto the base portion following ejection of the molded caps from the injection mold.

FIG. 1 illustrates an example of one-half of an injection mold 2 having a lid closing mechanism 4 configured to dispose molded caps in a closed position prior to ejection. For example, the lid closing mechanism 4 can include lid engagement members 5 disposed in proximity to corresponding mold cavities 6 utilized to form molded caps. The lid closing mechanism 4 also includes a linear actuator 7 configured to adjust the vertical positioning of the lid engagement members 5 relative to the molded caps and a rotational actuator 8 configured to rotate the lid engagement members 5 to close the respective lid portions onto the base portions of the molded caps.

SUMMARY

In an embodiment of the present innovation, an in-mold lid closing apparatus includes a frame, a first actuation assembly configured to linearly position a lid engagement member between a first and second linear position relative to an in-mold lid, and a second actuation assembly configured to rotatably position the lid engagement member between a first and second rotational position relative to the in-mold lid. The first actuation assembly includes a first support moveably coupled to the frame and a first actuator coupled to a frame support of the frame and a first actuator drive element coupled to the first support. The second actuation assembly includes a second support moveably coupled to the frame and disposed between the frame support and the first support and a second actuator coupled to the second support and extending from the second support through an opening defined by the frame support and a second actuator drive element coupled to the first support.

In an embodiment of the present innovation, an injection molding system includes a first mold plate defining a mold cavity, a second mold plate opposing the first mold plate, and an in-mold lid closing apparatus. The in-mold lid closing apparatus may include a frame, a first actuation assembly configured to linearly position a lid engagement member between a first and second linear position relative to an in-mold lid, and a second actuation assembly configured to rotatably position the lid engagement member between a first and second rotational position relative to the in-mold lid. The first actuation assembly includes a first support moveably coupled to the frame and a first actuator coupled to a frame support of the frame and a first actuator drive element coupled to the first support. The second actuation assembly includes a second support moveably coupled to the frame and disposed between the frame support and the first support and a second actuator coupled to the second support and extending from the second support through an opening defined by the frame support and a second actuator drive element coupled to the first support.

In an embodiment of the present innovation, an in-mold lid closing apparatus includes a frame; a first actuation assembly having a first actuator coupled to the frame and configured to linearly position a lid engagement member between a first linear position and a second linear position relative to an in-mold lid; and a second actuation assembly having a second actuator coupled to the frame and configured to rotatably position the lid engagement member between a first rotational position and a second rotational position relative to the in-mold lid. The first actuator may be disposed in a side by side relationship with the second actuator.

BRIEF DESCRIPTION OF THE DRAWINGS

The foregoing and other features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Figure 1:
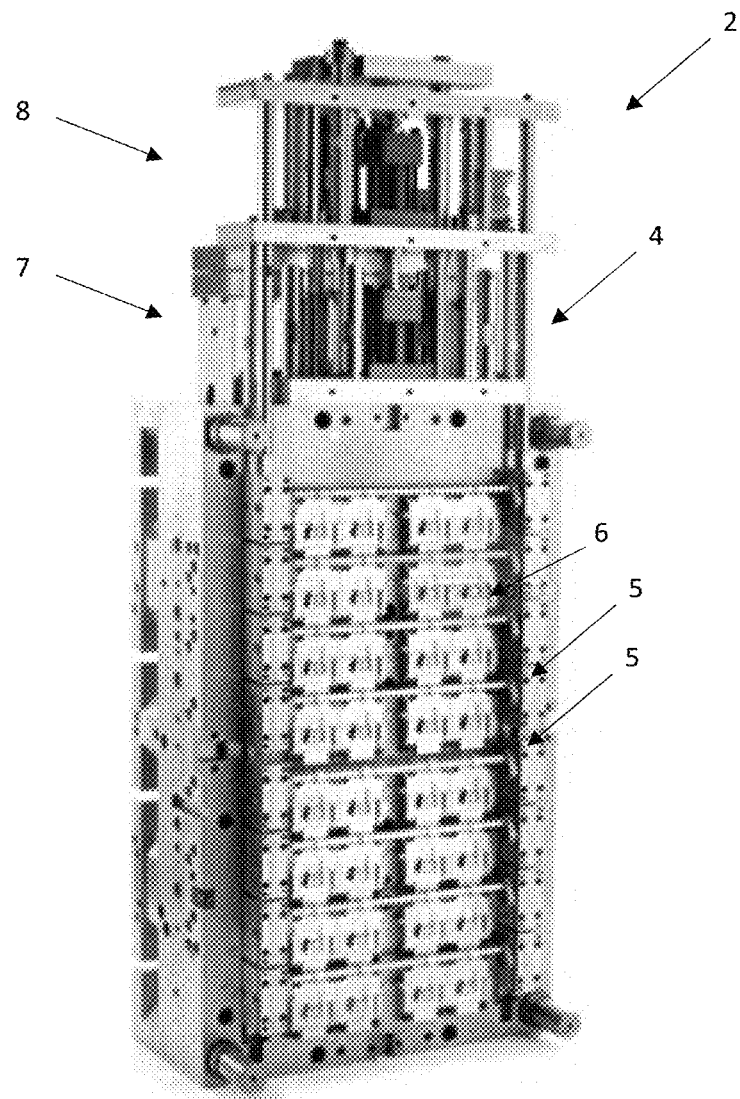
FIG. 1 illustrates one-half of a prior art injection mold having a lid closing mechanism.

With conventional injection molds, such as shown in FIG. 1, the lid closing mechanism 4 includes a linear actuator 7 and a rotational actuator 20 configured to position a lid engagement members 5 relative to a molded cap to dispose the molded cap in a closed state. However, in order to provide such motion to the lid engagement members 5, these injection molds 2 have the linear and rotational actuators 7, 8 disposed in a stacked arrangement (i.e., the rotational actuator 8 mounted on top of the linear actuator 7). While this arrangement produces the desired motion of the lid engagement members 5, stacking of the linear and rotational actuators 7, 8 adds to the overall height of the injection mold 2, thereby requiring a relatively large physical space for operation of the injection mold 2. Further, the use of multiple, separate actuation assemblies to position the lid engagement members can add to the cost of the injection mold, as well as to the complexity of injection mold which can, in turn, lead to an increase in the amount of maintenance for the injection mold.

By contrast to conventional lid closing mechanisms for injection molds, embodiments of the present innovation relate to a pneumatic in-mold lid closing apparatus. In an embodiment, the in-mold lid closing apparatus may include a set pneumatic actuators configured to linearly and rotationally position a set of lid engagement members relative to corresponding sets of in-mold molded caps. The apparatus may include a first pneumatic actuator connected to a frame at or near a central location. The first pneumatic actuator may also include a first actuator drive element connected to a first support. The apparatus may include second and third pneumatic actuators that may be disposed on either side of the first pneumatic actuator. The second and third pneumatic actuators may be connected to a second support disposed between the frame and the first support. The second and third pneumatic actuators may have corresponding drive elements connected to the second support. The first and second supports may be disposed in operational communication with a set of lid engagement members. For example, the first and second plates may be connected to a rack and pinion assembly which, in turn, may be connected to the lid engagement members.

According to embodiments of the present innovation, a computerized device may be configured to provide a set of signals to the pneumatic actuators to drive the plates, such as in a four-stage process. For example, in response to a control signal, the first pneumatic actuator may be configured to linearly position the first and second supports relative to the frame to dispose set of lid engagement members in proximity to the lids of the corresponding sets of in-mold molded caps in a first stage. The second and third pneumatic actuators may be configured to linearly position the second support relative to the frame to rotate the set of lid engagement members in a first direction from a first position underneath the lids to a second position to close the lids, responsive to a control signal in a second stage. The second and third pneumatic actuators may be configured to linearly position the second support relative to the frame to rotate the set of lid engagement members in an opposite, second direction from the second position to the first position, responsive to a control signal in a third stage. The first pneumatic actuator may be configured to then linearly position the first and second supports relative to the frame which, in turn, linearly positions the lid engagement members to a starting position, responsive to a control signal in the fourth stage.

With such a configuration of a pneumatic in-mold lid closing apparatus, the first, second, and third pneumatic actuators may be disposed in a side-by-side manner to minimize the height of the injection mold, relative to conventional injection molds. Further, the configuration of the first, second, and third pneumatic actuators with the first and second supports to sequentially position the set of lid engagement members may mitigate a need for separate and relatively complex linear and rotational actuators to position lid engagement members, such as those that may be found in conventional injection molds.

Figure 2:
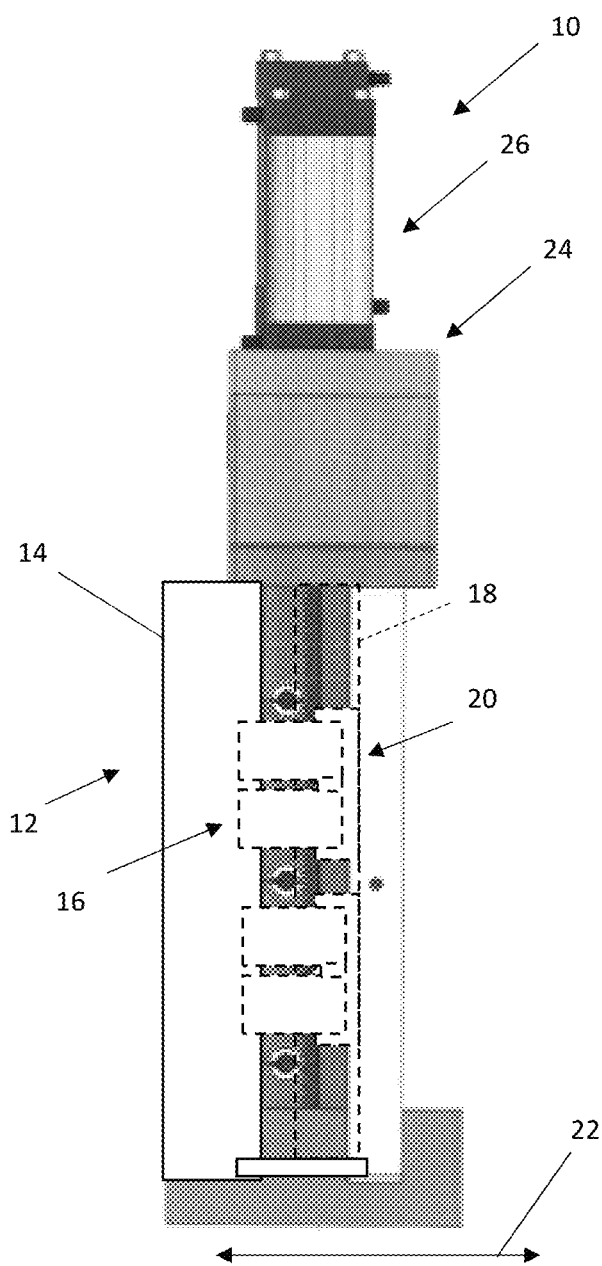
FIG. 2 illustrates a side-sectional, schematic view of an injection molding system having an in-mold lid closing apparatus.

FIG. 2 illustrates a schematic representation of an injection molding system 10, according to an embodiment of the present innovation. The injection molding system 10 includes a mold assembly 12 having a first mold plate 14 defining a first set of cap mold elements 16 and a second mold plate 18 defining a corresponding second set of cap mold elements 20. Taken together, the first and second set of cap mold elements 16, 20 define a volume of a cap having a lid, a base, and a hinge which attaches the lid to the base.

The injection molding system 10 may be configured to adjust the relative lateral positioning of the first and second mold plates 12, 18 and the corresponding first and second cap mold elements 16, 20. For example, during operation, the injection molding system 10 may position the first and second mold plates 12, 18 along axis 22 to a closed position, as shown, to allow the injection of a material into the volume between the first and second sets of mold elements 16, 20 to create a molded cap. Following formation of the molded caps, the injection molding system 10 may position the first and second mold plates 12, 18 along axis 22 to an open position to allow ejection of the caps from the second mold plate 18.

The illustrated injection molding system 10 also includes an in-mold lid closing apparatus 24 coupled to the second mold plate 18. The in-mold lid closing apparatus 24 may be configured to close the lid of each molded cap against the cap's base prior to ejection of the cap from the second mold plate 18. For example, following the molding procedure, the injection molding system 10 may position the first and second mold plates 12, 18 along axis 22 to an opened position. Further, actuation assemblies 26 of the in-mold lid closing apparatus 24 may linearly and rotationally position a lid engagement member (not shown) relative to the lids of a set of molded caps to close the lids against the corresponding bases. Following closing of the lids, the injection molding system 10 may eject the molded caps from the second mold plate 18. The molding process may then be repeated.

Figure 3:
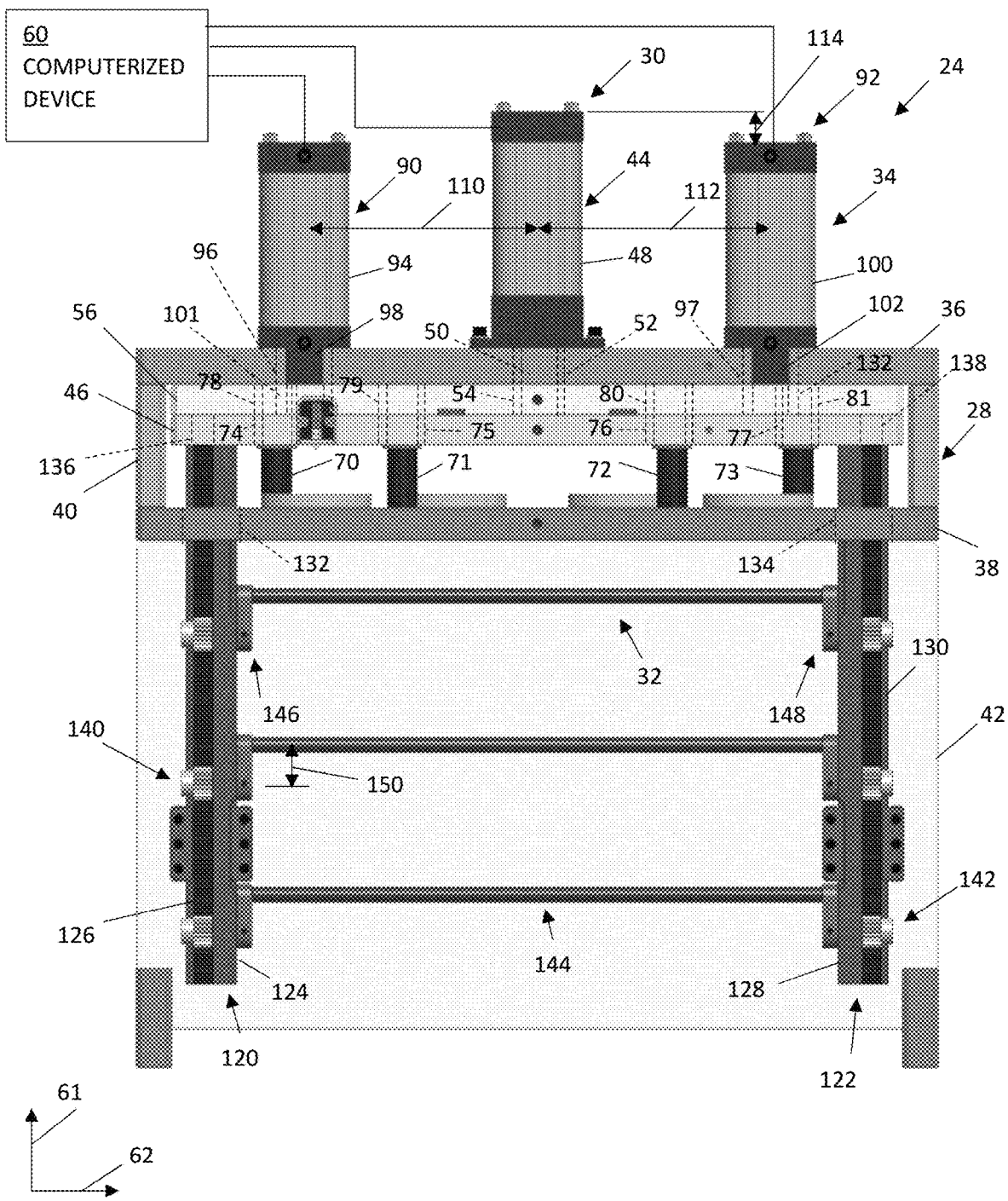
FIG. 3 illustrates a front view of the in-mold lid closing apparatus of FIG. 2.
Figure 4:
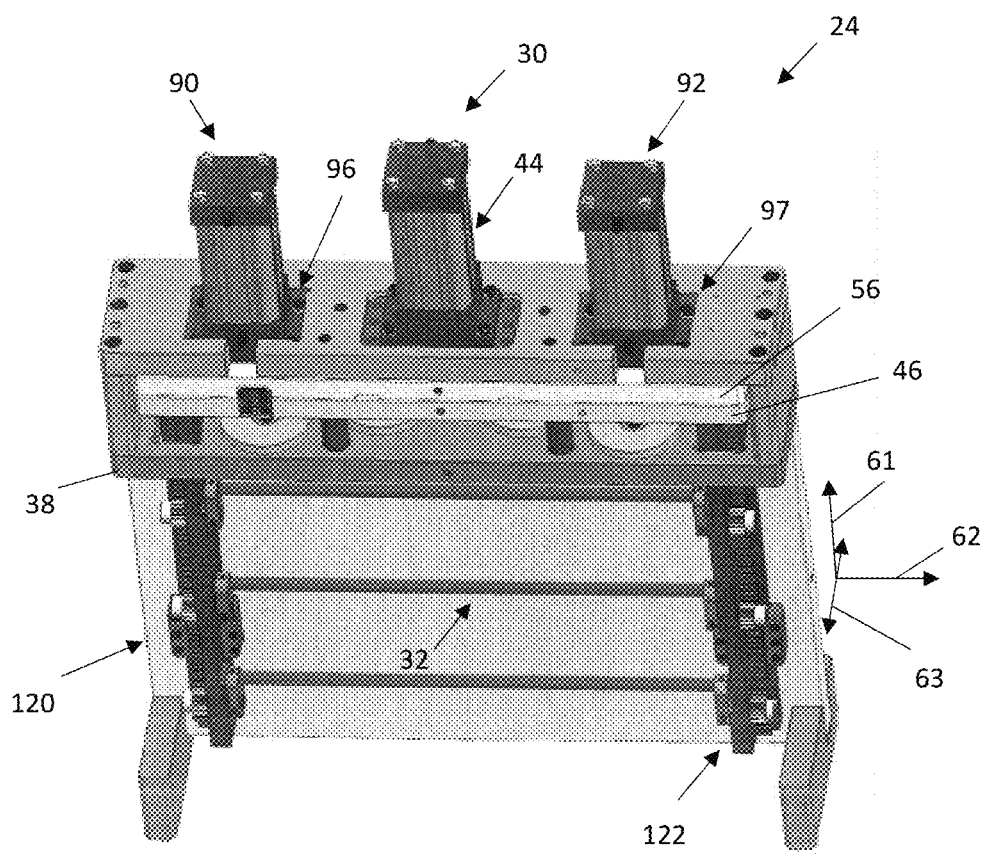
FIG. 4 illustrates a top perspective view of the in-mold lid closing apparatus of FIG. 2.
Figure 5:
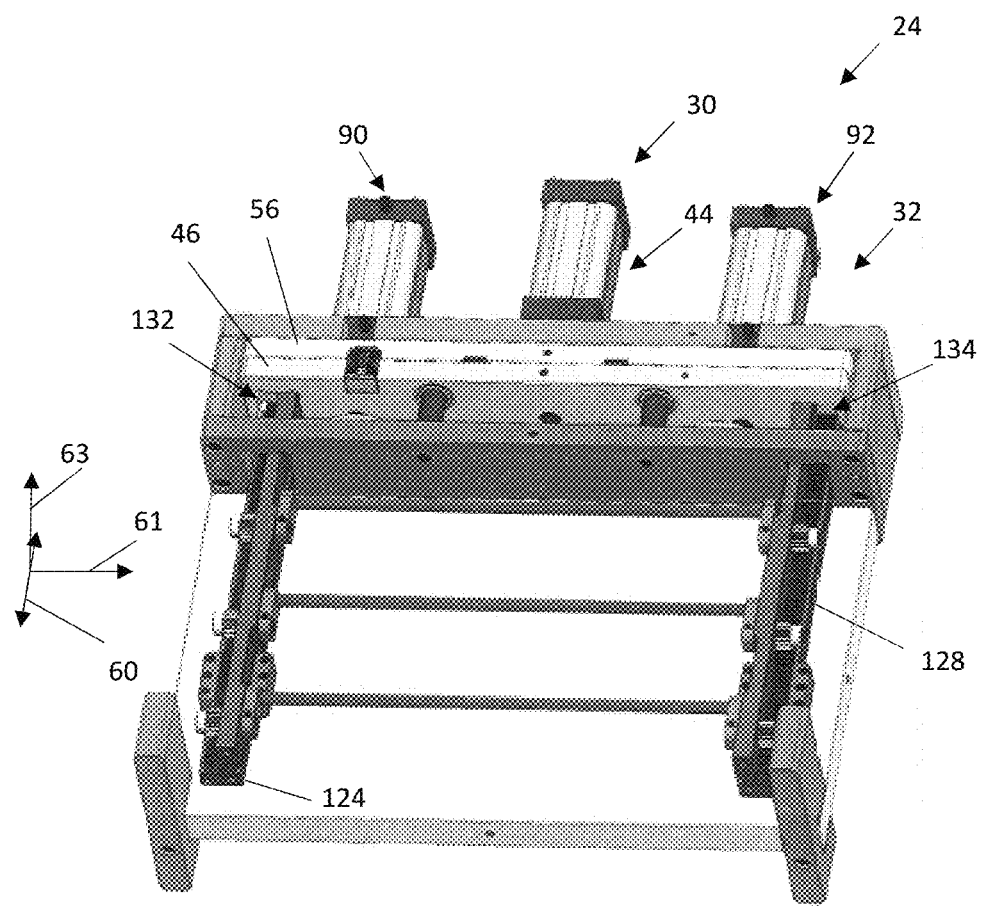
FIG. 5 illustrates a bottom perspective view of the in-mold lid closing apparatus of FIG. 2.

The in-mold lid closing apparatus 24 may be configured in a variety of ways. FIGS. 3-5 illustrate an embodiment of an in-mold lid closing apparatus 24, according to embodiment of the present innovation. As shown, the in-mold lid closing apparatus 24 includes a frame 28, a first actuation assembly 30, and a second actuation assembly 34.

The frame 28 of the in-mold lid closing apparatus 24 may be configured to support the first and second actuation assemblies 30, 34 and to maintain a relative positioning of one or more lid engagement members 32 relative to the in-mold lids. For example, the frame 28 may include a frame support 36 and a stop portion 38 coupled to each other via side members 40. The side members 40 may dispose the frame support 36 and the stop portion 38 at a distance from each other to allow linear motion and operation of the first and second actuation assemblies 30, 34. In the example illustrated, frame 28 also includes a base plate 40 coupled to the stop portion 38 and configured to be secured to the second mold plate 18 of the injection molding system 10. For example, the base plate 42 may be secured to the second mold plate 18 to dispose the lid engagement members 32 proximate to the second set of mold elements 20 as identified in FIG. 2. Such positioning allows the lid engagement members 32 to selectively engage the molded caps during operation.

Returning to FIGS. 3-5, for example, the first actuation assembly 30 may be configured to linearly position the lid engagement members 32 between a first and second linear position relative to an in-mold lid. For example, the first actuation assembly 30 may include a first actuator 44 and a first support 46 moveably coupled to the frame 28 and coupled to the lid engagement members 32.

According to an embodiment of the present innovation, the first actuator 44 may take the form of or include a pneumatic device having a first actuator housing 48 coupled to the frame support 36 of the frame 28 and a first actuator drive element 50, such as a shaft, moveably coupled to the housing 48 and having an end coupled to the first support 46. Actuator 44 may take other forms as well, such as an electronic actuator. According to an embodiment of the present innovation, the first actuator drive element 50 may extend from the first actuator 44 to the first support 46 through a first opening 52, defined by the frame support 36, and a second opening 54, defined by a second support 56. First actuator 44 may be disposed in electrical communication with a computerized device 60 having a controller, such as a processor and memory. The computerized device 60 may take the form of a general purpose computer, such as a laptop or desktop computer, or of a mobile computerized device, such as a tablet device or smartphone. During operation, the computerized device 60 can generate and transmit a control signal to first actuator 44 to adjust a linear position of the first actuator drive element 50 and the first support 46 along a vertical axis or y-direction 61. Such adjustment can, in turn, adjust a linear position of the lid engagement member 32 along the vertical axis 61. Example control signals may take the form of digital or analog signals.

First support 46 may be moveably coupled to the frame 28 in a variety of ways. For example, frame 28 may include a set of bushings, such as a first bushing 70, a second bushing 71, a third bushing 72, and a fourth bushing 73, disposed between the frame support 36 and the stop portion 38. Each bushing 70, 71, 72, 73 may extend through a corresponding opening 74, 75, 76, 77 defined by the first support 46 and through corresponding openings 78, 79, 80, 81 defined by a second support 56 of the second actuation assembly 34. During operation, interaction between the bushings 70, 71, 72, 73 and the first support 46 may facilitate linear translation of the first support 46 along vertical axis 61 during operation, and mitigate rotation or binding of the first support 46 relative to the frame 28.

According to an embodiment of the present innovation, actuator housing 48 of the first actuator 44 may be coupled to the frame support 36 at a substantially central location relative to the lid engagement members 32. First actuator drive element 50 may be coupled to the first support 46 at a substantially central location relative to the lid engagement members 32. With such positioning, the first actuator 44 may provide a substantially even distribution of load on the first support 46 to mitigate twisting or rotation of the of the lid engagement members 32 during actuation of the first actuator drive element 50.

The second actuation assembly 34 may be configured to rotatably position the lid engagement members 32 between a first and second rotational position relative to the in-mold lid. For example, the second actuation assembly 34 may include a second actuator 90, a third actuator 92, and the second support 56 which may be moveably coupled to the frame 28 and disposed between the frame support 36 and the first support 46.

Figure 7:
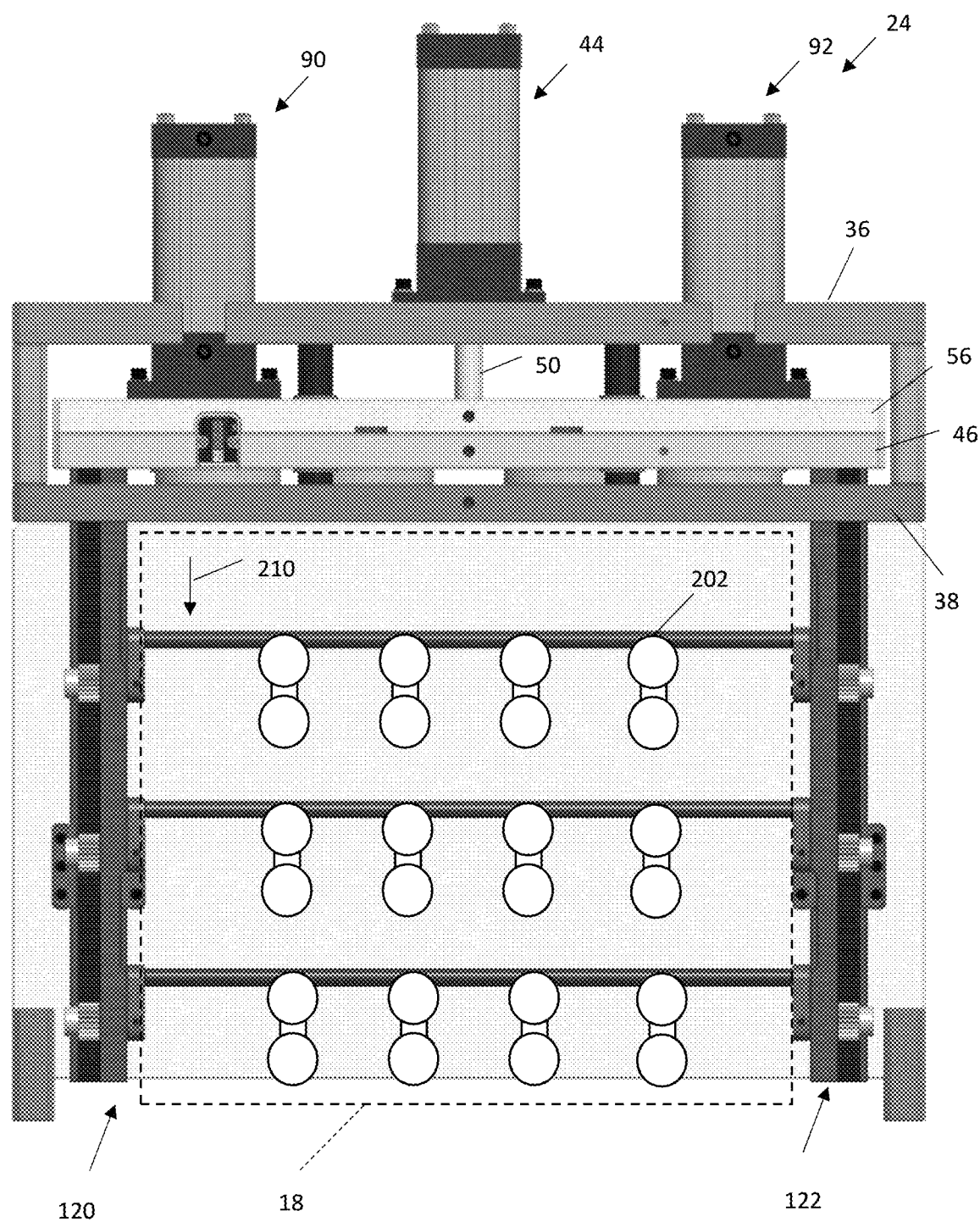
FIG. 7 illustrates the in-mold lid closing apparatus of FIG. 6 having the first actuation assembly disposed in a second position relative to the set of in-mold lids.

According to an embodiment of the present innovation, the second actuator 90 may take the form of or include a pneumatic device and may include a second actuator housing 94 coupled to the second support 56, as best shown in FIG. 7, which may extend from the second support 56 through an opening 96 defined by the frame support 36. Actuator 90 may take other forms as well, such as an electronic actuator. According to an embodiment of the present innovation, second actuator 90 may include a second actuator drive element 98, such as a shaft, moveably coupled to the second actuator housing 94 and having an end coupled to the first support 46. For example, the second actuator drive element 98 may extend from the second actuator 90 to the first support 46 through an opening 101, defined by the second support 56.

According to an embodiment of the present innovation, third actuator 92 may take the form of or include a pneumatic device and may include a third actuator housing 100 coupled to the second support 56, as best shown in FIG. 7, which extends from the second support 56 through an opening 97 defined by the frame support 36. Actuator 92 may take other forms as well, such as an electronic actuator. According to an embodiment of the present innovation, third actuator 92 may include a third actuator drive element 102, such as a shaft, moveably coupled to the third actuator housing 100 and having an end coupled to the first support 46. For example, the third actuator drive element 102 may extend from the third actuator 92 to the first support 46 through an opening 132, defined by the second support 56.

According to an embodiment of the present innovation, the second actuator 90 and third actuator 92 may be disposed in electrical communication with the computerized device 60. During operation, the computerized device 60 generates and transmits control signals to each actuator 90, 92 to adjust a linear position of the second actuator drive element 98 and the third actuator drive element 102 along a vertical axis 61. Such adjustment can, in turn, adjust a rotational position of the lid engagement members 32 along a horizontal axis or x-direction 62.

The second support 56 can be moveably coupled to the frame 28 in a variety of ways. For example, the frame 28 may include bushings 70, 71, 72, 73, which may extend through a corresponding opening 78, 79, 80, 81 defined by the second support 56. During operation, interaction between the bushings 70, 71, 72, 73 and the second support 56 facilitates linear translation of the second support 56 along the vertical axis 61 during operation and mitigates rotation or binding of the second support 56 relative to the frame 28.

According to an embodiment of the present innovation, second and third actuators 90, 92 may be disposed in a side-by-side manner relative to the first actuator 44. For example, the second actuator 90 may be disposed at a first lateral location relative to the first actuator 44, the first lateral location defining a first distance 110 between the second actuator 90 and the first actuator 44. Further, the third actuator 92 may be disposed at a second lateral location relative to the first actuator 44, the second lateral location defining a second distance 112 between the third actuator 92 and the first actuator 44. The first distance 110 may be substantially equal to the second distance 112. During operation, the second and third actuators 90, 92 may provide a substantially even distribution of load on the first support 46 to mitigate twisting or rotation of the of the lid engagement members 32 during actuation of the second and third actuator drive elements 98, 102.

Positioning of the second and third actuators 90, 92 relative to the first actuator 44 may also reduce the overall height of the in-mold lid closing apparatus 24. For example, the second and third actuator housings 94, 100 of the second and third actuators 90, 92 may be disposed substantially next to and in a side by side relationship with the first actuator housing 48 of the first actuator 44. Additionally, the second and third actuator housings 94, 100 may be coupled to the second support 56, which may be disposed below the frame support 36 which carries the first actuator housing 48. To facilitate linear movement of the second and third actuators 90, 92 relative to the first actuator 44 during operation, the second and third actuator housings 94, 100 may extend through corresponding openings 96, 97 defined by the frame support 36. With such positioning, each of the second and third actuators 90, 92 may be disposed at a height that is offset from a height of the first actuator 44 by a distance 114.

The first and second actuation assemblies 30, 34 may be coupled to the lid engagement members 32 in a variety of ways. For example, the in-mold lid closing apparatus 24 may include first and second rack and pinon assemblies 120, 122 coupled to the lid engagement members 32 via the first and second actuation assemblies 30, 34. As illustrated, first and second rack and pinon assemblies 120, 122 may be disposed on opposing sides of the second and third actuators 90, 92 with the first rack and pinion assembly 120 being disposed at a first lateral position relative to the second actuator 90, and the second rack and pinion assembly 122 being disposed at a second lateral position relative to the third actuator 92. The first, second, and third actuators 44, 90, 92 may be disposed between the first and second rack and pinon assemblies 120, 122 with the first actuator 44 disposed at a substantially central location relative to the first and second rack and pinon assemblies 120, 122. Such positioning may balance the loads generated by the first, second, and third actuators 44, 90, 92 on the lid engagement members 32 and mitigate twisting or rotation of the of the lid engagement members 32 during actuation.

The first and second rack and pinon assemblies 120, 122 may be configured to adjust both the linear and rotational position of the lid engagement members 32 in response to activation by the first and second actuation assemblies 30, 34. For example, the first rack and pinion assembly 120 may include a first base 124 coupled to the first support 46 and a first rack 126 carried by the first base 124 and coupled to the second support 56. The second rack and pinion assembly 122 may include a second base 128 coupled to the first support 46 and a second rack 130 carried by the second base 128 and coupled to the second support 56.

The first base 124 may extend through an opening 132 defined by the stop portion 38 such that an end of the first base 124 may be coupled to the first support 46 while the first rack 126 extends through the opening 132 and through an opening 136 defined by the first support 46 such that an end of the first rack 126 may be coupled to the second support 56. Further, the second base 128 may extend through an opening 134 defined by the stop portion 38 such that an end of the second base 128 may be coupled to the first support 46 while the second rack 130 extends through the opening 132 and through an opening 138 defined by the first support 46 such that an end of the second rack 126 may be coupled to the second support 56.

With such a configuration, the first support 46 may be configured to translate both the first base 124 and the first rack 126, as well as both the second base 128 and the second rack 130, along the vertical axis 61 relative to the frame 28 during operation. Further, the second support 56 may be configured to translate the first rack 126 along the vertical axis 61 relative to the first base 124 and the second rack 128 along the vertical axis 61 relative to the second base 128 during operation.

The first and second rack and pinon assemblies 120, 122 may also include respective sets of pinions 140, 142 coupled to the lid engagement members 32. According to an embodiment of the present innovation, lid engagement members 32 may be configured as shafts 144 extending along a direction substantially parallel to the horizontal axis 62 and substantially parallel to an axis of rotation of a lid portion of an in-mold lid. Each shaft of the shafts 144 may include a first end coupled to a pinion of the first set of pinions 140 via a corresponding first cam 146 and a second end coupled to an opposing pinion of the second set of pinions 142 via a corresponding second cam 148. For example, first and second cams 146, 148 may be coupled to corresponding first and second pinions via axles (not shown) carried by the first and second bases 124, 128, respectively. The first and second cams 146, 148 may dispose the corresponding shafts 144 at an offset distance 150 from the rotational axis of the axles which facilitates rotation of the shafts 144 in both the y-direction 61 and the z-direction 63 during operation.

First and second actuation assemblies 30, 34 may be configured to operate in a sequential manner to laterally and rotationally position the lid engagement members 32 relative to a set of in-mold lids. FIGS. 6-10 illustrate an example operation of the in-mold lid closing apparatus 24, in an embodiment of the present innovation.

Figure 6:
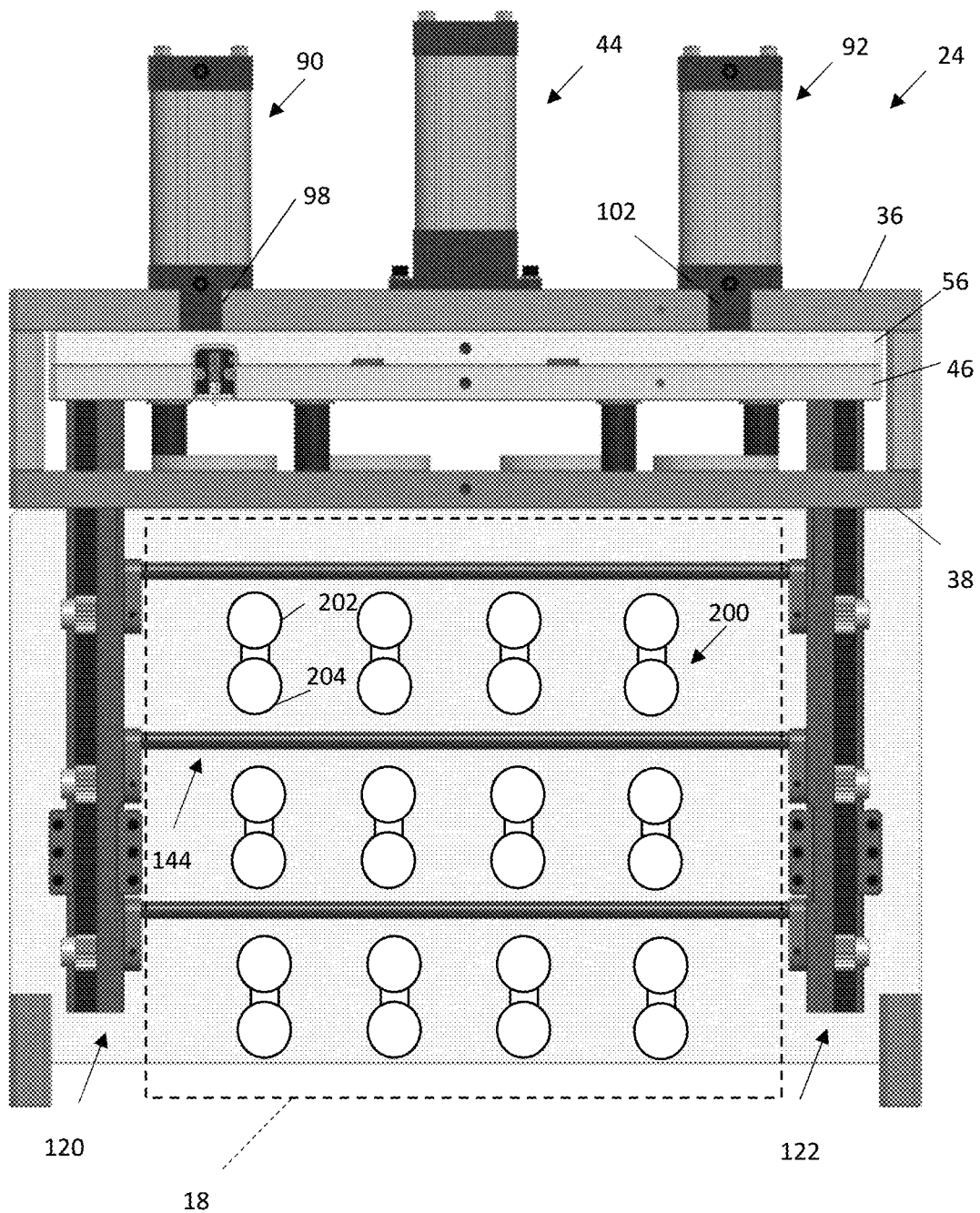
FIG. 6 illustrates a front view of the in-mold lid closing apparatus of FIG. 2 having a first actuation assembly and a second actuation assembly disposed in a first position relative to a set of in-mold lids.

In the illustrated embodiment, referring first to FIG. 6, following a molding and cooling process, the second mold plate 18 includes a set of in-mold lids 200 having caps 202 disposed in an open position relative to the corresponding bases 204. In an initial position, the first, second, and third actuators 44, 90, 92 maintain their respective actuator drive elements 50, 98, 102 in a retracted state to position the first and second supports 46, 56 in proximity to the frame support 36. This, in turn, positions the first and second rack and pinion assemblies 120, 122 and corresponding shafts 144 in a first position relative to the caps 202 of the in-mold lids 200, as shown.

To begin the in-mold lid closing process, the computerized device 60 provides an activation or control signal to the first actuator 44 to cause the first actuator 44 to extend the first actuator drive element 50. With reference to FIG. 7, such extension disposes the first support 46 from a first position in proximity to the frame support 36 to a second position in proximity to the stop portion 38. Linear motion of the first support 46, in turn, translates both of the first and second rack and pinion assemblies 120, 122 along direction 210 to dispose the shafts 144 under the caps 202 of the in-mold lids. Further, because the second support 56 may translate along the bushings 70, 71, 72, 73 between the frame support 36 and first support 46, linear motion of the first support 46 causes the second support 56 and the second and third actuators 90, 92 to translate along direction 210 from a first position in proximity to the frame support 36 to a second position in proximity to the stop portion 38.

Figure 8:
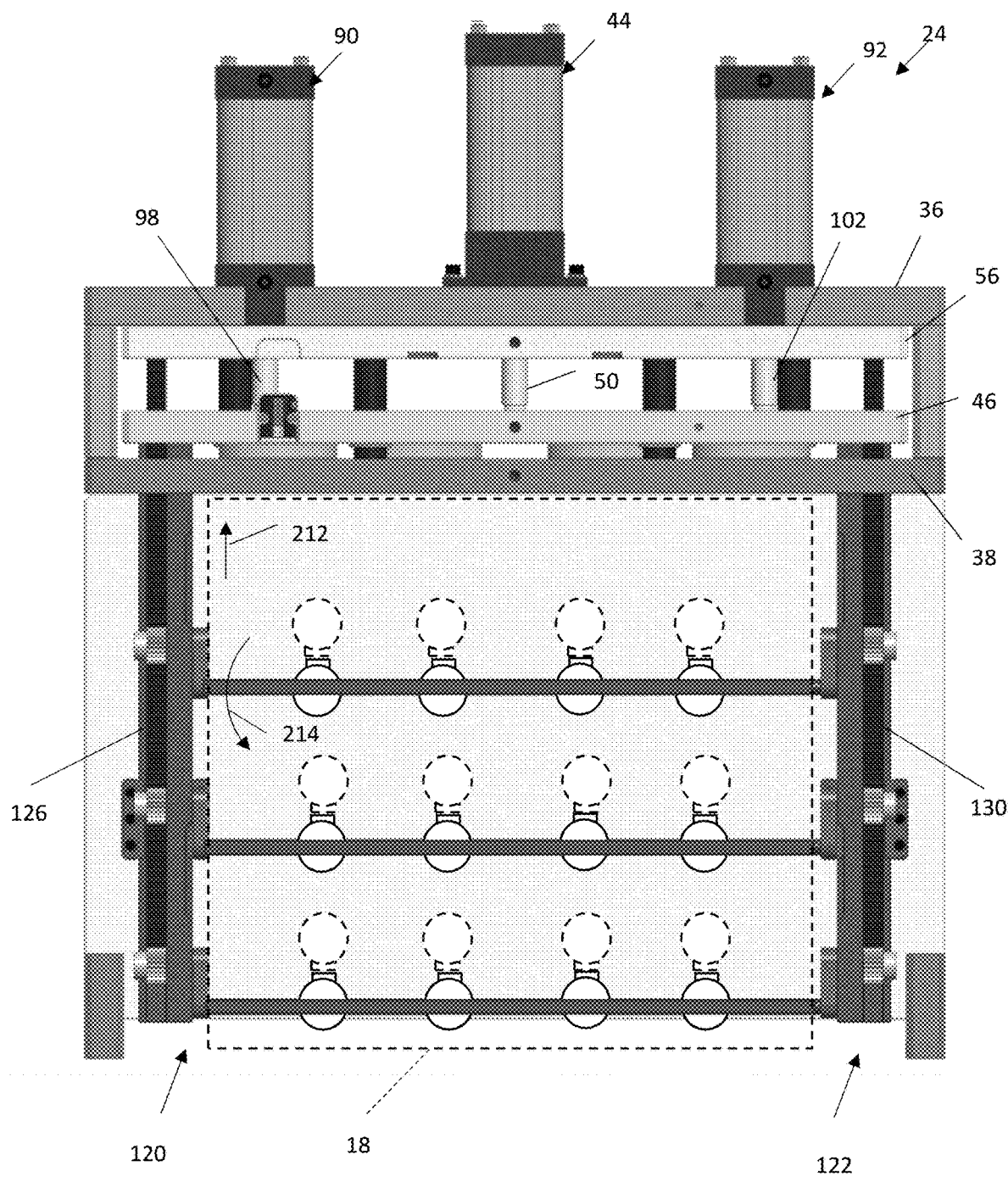
FIG. 8 illustrates the in-mold lid closing apparatus of FIG. 6 having the second actuation assembly disposed in a second position relative to the set of in-mold lids.

Next, the computerized device 60 provides an activation or control signal to the second and third actuators 90, 92 to cause the second and third actuators 90, 92 to extend their respective second and third actuator drive elements 98, 102. With reference to FIG. 8, such extension disposes the second support 56 and the second and third actuator housings 94, 100 from the second position in proximity to the stop portion 38 to the first position in proximity to the frame support 36. Linear motion of the second support 56, in turn, translates both of the first and second racks 126, 130 along vertical direction 212 relative to the sets of pinions 140, 142. Such translation causes the pinions 140, 142 and shafts 144 to rotate in a counterclockwise direction 214 from a first rotational position to a second rotational position to close the caps 202 against the bases 204 of each of the in-mold lids.

Figure 9:
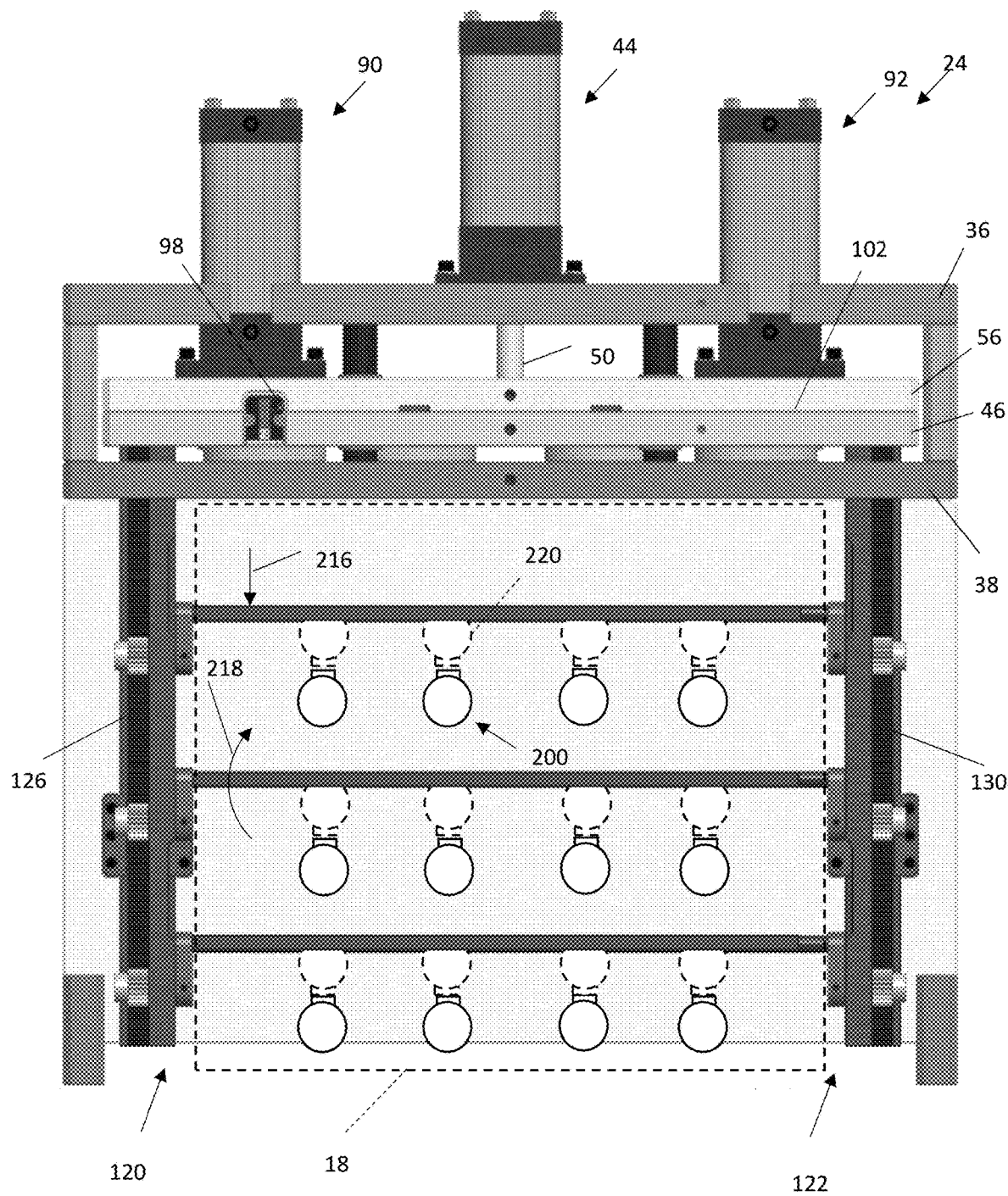
FIG. 9 illustrates the in-mold lid closing apparatus of FIG. 6 having the second actuation assembly disposed in the first position relative to the set of in-mold lids.

Next, the computerized device 60 provides an activation or control signal to the second and third actuators 90, 92 to cause the second and third actuators 90, 92 to retract their respective second and third actuator drive elements 98, 102. With reference to FIG. 9, such retraction disposes the second support 56 and the second and third actuator housings 94, 100 from the first position in proximity to the frame support 36 to the first position in proximity to the stop portion 38. Linear motion of the second support 56, in turn, translates both of the first and second racks 126, 130 along vertical direction 216 relative to the sets of pinions 140, 142. Such translation causes the pinions 140, 142 and shafts 144 to rotate in a clockwise direction 218 from the second rotational position, as shown in FIG. 8, to the first rotational position, as shown in FIG. 9, thereby allowing the second mold plate 18 to eject the in-mold caps 200 from the molds 220.

Figure 10:
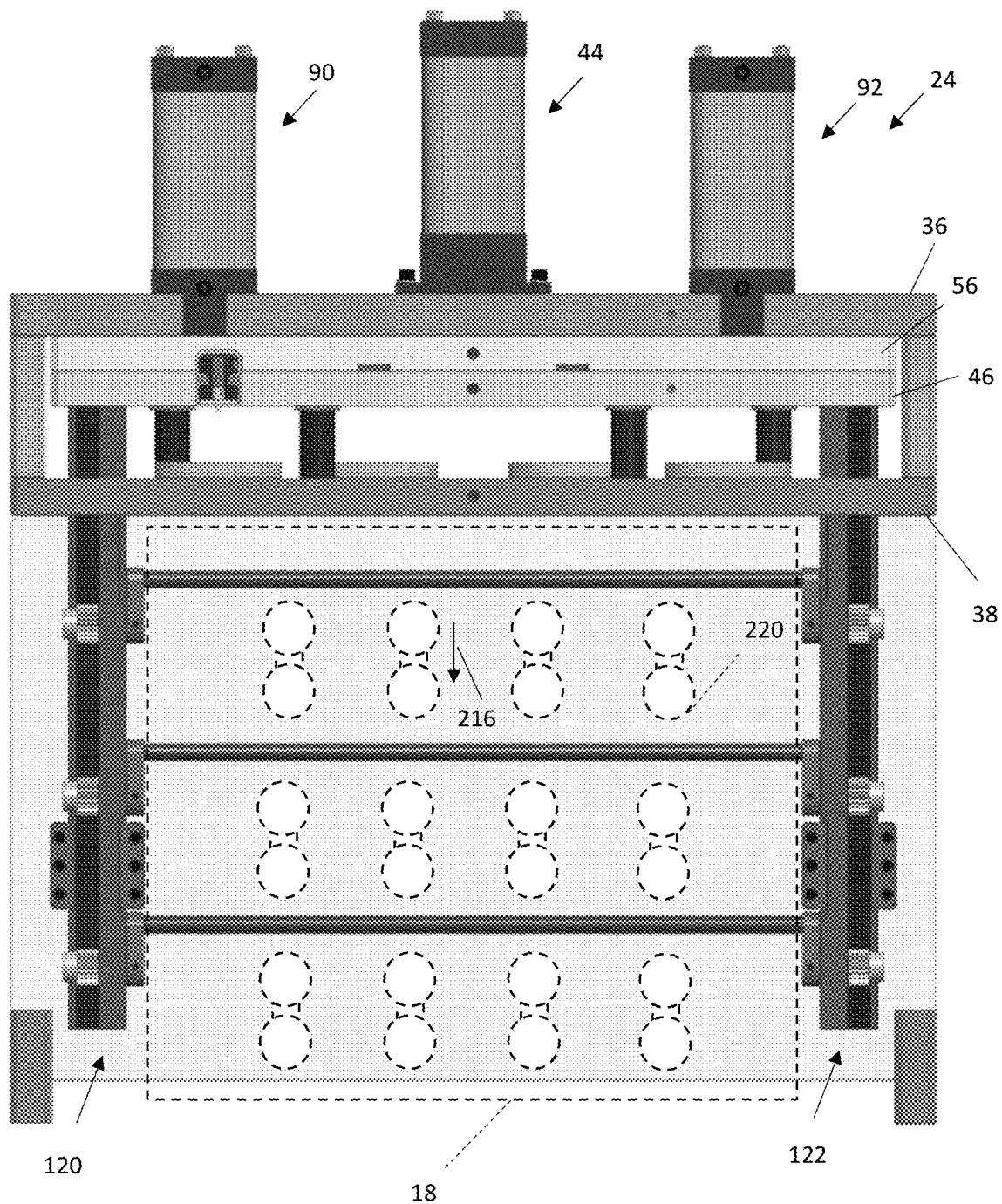
FIG. 10 illustrates the in-mold lid closing apparatus of FIG. 6 having the first actuation assembly disposed in the first position relative to a set of in-mold lid cavities following ejection of the in-mold lids.

Next, the computerized device 60 provides an activation or control signal to the first actuator 44 to cause the first actuator 44 to retract the first actuator drive element 50. With reference to FIG. 10, such retraction disposes the first support 46 from the second position in proximity to the stop portion 38 to the first position in proximity to the frame support 36. Linear motion of the first support 46, in turn, translates both of the first and second rack and pinion assemblies 120, 122 along direction 222 to dispose the shafts 144 in a spaced relation relative to the molds 220 of the second mold plate 18. Further, because the second support 56 may translate along the bushings 70, 71, 72, 73 between the frame support 36 and first support 46, linear motion of the first support 46 causes the second support 56 and the second and third actuators 90, 92 to translate along direction 222 from the second position in proximity to the stop portion 38 to the first position in proximity to the frame support 36.

With such a configuration of the in-mold lid closing apparatus 24, the first, second, and third pneumatic actuators 44, 90, and 92 may be disposed in a side-by-side manner to minimize the height of a corresponding injection molding system 10, relative to conventional injection molds. Further, the configuration of the first, second, and third actuators 44, 90, and 92 with the first and second supports 46, 56 to sequentially position the set of lid engagement members mitigates for separate and relatively complex linear and rotational actuators to position lid engagement members such as those that may be found in conventional injection molds.

While various embodiments of the innovation have been particularly shown and described, it will be understood by those skilled in the art that various changes in form and details may be made therein without departing from the spirit and scope of the innovation as defined by the appended claims.

What is claimed is:

1. An in-mold lid closing apparatus, comprising:
    a frame;
    a first actuation assembly configured to linearly position a lid engagement member between a first linear position and a second linear position relative to an in-mold lid, the first actuation assembly comprising:
        a first support moveably coupled to the frame, and
        a first actuator coupled to a frame support of the frame and having a first actuator drive element coupled to the first support; and
    a second actuation assembly configured to rotatably position the lid engagement member between a first rotational position and a second rotational position relative to the in-mold lid, the second actuation assembly comprising:
        a second support moveably coupled to the frame and disposed between the frame support and the first support, and
        a second actuator coupled to the second support and extending from the second support through an opening defined by the frame support and having a second actuator drive element coupled to the first support.

2. The in-mold lid closing apparatus of claim 1, further comprising at least one rack and pinon assembly having:
    a base coupled to the first support;
    a rack carried by the base and coupled to the second support; and
    a pinion coupled to the lid engagement member and rotatably coupled to the rack.

3. The in-mold lid closing apparatus of claim 2, wherein the lid engagement member comprises a shaft extending along a direction substantially parallel to an axis of rotation of a lid portion of the in-mold lid, the shaft coupled to the pinion of the at least one rack and pinion assembly.

4. The in-mold lid closing apparatus of claim 1, wherein the first actuator is coupled to the frame support at a substantially central location relative to the lid engagement member.

5. The in-mold lid closing apparatus of claim 1, wherein the lid engagement member comprises a shaft extending along a direction substantially parallel to an axis of rotation of a lid portion of the in-mold lid and further comprising:
    a first rack and pinon assembly having a first base coupled to the first support, a first rack carried by the first base and coupled to the second support, and a first pinion coupled to a first end of the shaft and rotatably coupled to the first rack; and
    a second rack and pinion assembly having a second base coupled to the first support, a second rack carried by the second base and coupled to the second support, and a second pinion coupled to a second end of the shaft and rotatably coupled to the second rack.

6. The in-mold lid closing apparatus of claim 5, wherein the second actuation assembly further comprises a third actuator coupled to the second support and having a third actuator drive element coupled to the first support.

7. The in-mold lid closing apparatus of claim 6, wherein:
    the first actuator is coupled to the frame support at a substantially central location relative to the first rack and pinion assembly and the second rack and pinion assembly;
    the second actuator is disposed at a first lateral location relative to the first actuator, the first lateral location defining a first distance between the second actuator and the first actuator, wherein the second actuator extends from the second support through a first opening defined by the frame support; and the third actuator is disposed at a second lateral location relative to the first actuator, the second lateral location defining a second distance between the third actuator and the first actuator, the second distance being substantially equal to the first distance, wherein the third actuator extends from the second support through a second opening defined by the frame support.

8. The in-mold lid closing apparatus of claim 1, further comprising at least one bushing coupled to the frame, the first support moveably coupled to the frame via the at least one bushing and the second support moveably couple to the frame via the at least one bushing.

9. The in-mold lid closing apparatus of claim 1, wherein when linearly positioning the lid engagement member between the first linear position and the second linear position relative to the in-mold lid, the first actuation assembly is configured to extend the first actuator drive element to dispose the first support from a first position in proximity to the frame support to a second position in proximity to a stop portion (i) to linearly position the lid engagement member from the first linear position to the second linear position relative to the in-mold lid and (ii) to position the second support and the second actuator from a first position in proximity to the frame support to a second position in proximity to the stop portion.

10. The in-mold lid closing apparatus of claim 9, wherein when rotatably positioning the lid engagement member between a first rotational position and a second rotational position relative to the in-mold lid, the second actuation assembly is configured (i) to extend the second actuator drive element to dispose the second support and the second actuator from the second position in proximity to the stop portion to the first position in proximity to the frame support and to rotatably position the lid engagement member from the first rotational position to the second rotational position relative to the in-mold lid and (ii) to retract the second actuator drive element to dispose the second support and the second actuator from the first position in proximity to the frame support to the second position in proximity to the stop portion and to rotatably position the lid engagement member from the second rotational position to the first rotational position relative to the in-mold lid.

11. An injection molding system, comprising:
a first mold plate defining a mold cavity;
a second mold plate opposing the first mold plate; and
an in-mold lid closing apparatus coupled to the second mold plate, the in-mold lid closing apparatus comprising:
a frame,
a first actuation assembly configured to linearly position a lid engagement member between a first linear position and a second linear position relative to an in-mold lid, the first actuation assembly comprising:
a first support moveably coupled to the frame, and
a first actuator coupled to a frame support of the frame and having a first actuator drive element coupled to the first support, and
a second actuation assembly configured to rotatably position the lid engagement member between a first rotational position and a second rotational position relative to the in-mold lid, the second actuation assembly comprising:

a second support moveably coupled to the frame and disposed between the frame support and the first support, and
a second actuator coupled to the second support and extending from the second support through an opening defined by the frame support and having a second actuator drive element coupled to the first support.

12. The injection molding system of claim 11, further comprising at least one rack and pinon assembly having:
a base coupled to the first support;
a rack carried by the base and coupled to the second support; and
a pinion coupled to the lid engagement member and rotatably coupled to the rack.

13. The injection molding system of claim 12, wherein the lid engagement member comprises a shaft extending along a direction substantially parallel to an axis of rotation of a lid portion of the in-mold lid, the shaft coupled to the pinion of the at least one rack and pinion assembly.

14. The injection molding system of claim 11, wherein the first actuator is coupled to the frame support at a substantially central location relative to the lid engagement member.

15. The injection molding system of claim 11, wherein the lid engagement member comprises a shaft extending along a direction substantially parallel to an axis of rotation of a lid portion of the in-mold lid and further comprising:
a first rack and pinon assembly having a first base coupled to the first support, a first rack carried by the first base and coupled to the second support, and a first pinion coupled to a first end of the shaft and rotatably coupled to the first rack; and
a second rack and pinion assembly having a second base coupled to the first support, a second rack carried by the second base and coupled to the second support, and a second pinion coupled to a second end of the shaft and rotatably coupled to the second rack.

16. The injection molding system of claim 15, wherein the second actuation assembly further comprises a third actuator coupled to the second support and having a third actuator drive element coupled to the first support.

17. The injection molding system of claim 16, wherein:
the first actuator is coupled to the frame support at a substantially central location relative to the first rack and pinion assembly and the second rack and pinion assembly;
the second actuator is disposed at a first lateral location relative to the first actuator, the first lateral location defining a first distance between the second actuator and the first actuator, wherein the second actuator extends from the second support through a first opening defined by the frame support; and
the third actuator is disposed at a second lateral location relative to the first actuator, the second lateral location defining a second distance between the third actuator and the first actuator, the second distance being substantially equal to the first distance, wherein the third actuator extends from the second support through a second opening defined by the frame support.

18. The injection molding system of claim 11, further comprising at least one bushing coupled to the frame, the first support moveably coupled to the frame via the at least one bushing and the second support moveably couple to the frame via the at least one bushing.

19. The injection molding system of claim 11, wherein when linearly positioning the lid engagement member between the first linear position and the second linear position relative to the in-mold lid, the first actuation assembly is configured to extend the first actuator drive element to dispose the first support from a first position in proximity to the frame support to a second position in proximity to a stop portion (i) to linearly position the lid engagement member from the first linear position to the second linear position relative to the in-mold lid and (ii) to position the second support and the second actuator from a first position in proximity to the frame support to a second position in proximity to the stop portion.

20. The injection molding system of claim 19, wherein when rotatably positioning the lid engagement member between a first rotational position and a second rotational position relative to the in-mold lid, the second actuation assembly is configured (i) to extend the second actuator drive element to dispose the second support and the second actuator from the second position in proximity to the stop portion to the first position in proximity to the frame support and to rotatably position the lid engagement member from the first rotational position to the second rotational position relative to the in-mold lid and (ii) to retract the second actuator drive element to dispose the second support and the second actuator from the first position in proximity to the frame support to the second position in proximity to the stop portion and to rotatably position the lid engagement member from the second rotational position to the first rotational position relative to the in-mold lid.

21. The in-mold lid closing apparatus of claim 2, wherein:
the second actuator is configured to translate the second support and rack along a linear direction; and
in response to linear translation of the rack, the pinion is configured to rotate from a first rotational position to a second rotational position to close a cap of the in-mold lid against a base of the in-mold lid.

22. The injection molding system of claim 11, wherein:
the second actuator is configured to translate the second support and rack along a linear direction; and
in response to linear translation of the rack, the pinion is configured to rotate from a first rotational position to a second rotational position to close a cap of the in-mold lid against a base of the in-mold lid.

\* \* \* \* \*